US007541407B2

(12) United States Patent
Murdaugh, Sr. et al.

(10) Patent No.: US 7,541,407 B2
(45) Date of Patent: Jun. 2, 2009

(54) PROCESS FOR ADDING METHINE UV LIGHT ABSORBERS TO PET PREPARED BY DIRECT ESTERIFICATION

(75) Inventors: Perry Michael Murdaugh, Sr., Lexington, SC (US); Earl Edmondson Howell, Jr., Kingsport, TN (US); Cory Lee Wells, Gray, TN (US); Max Allen Weaver, Kingsport, TN (US); Jason Clay Pearson, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 501 days.

(21) Appl. No.: 10/855,722

(22) Filed: May 27, 2004

(65) Prior Publication Data

US 2005/0277758 A1   Dec. 15, 2005

(51) Int. Cl.
*C08K 5/06* (2006.01)
(52) U.S. Cl. .................................. 524/755; 528/272
(58) Field of Classification Search ................ 524/755; 528/272

See application file for complete search history.

(56) References Cited

U.S. PATENT DOCUMENTS

| | | |
|---|---|---|
| 3,689,481 A | 9/1972 | Scheuermann et al. |
| 3,781,213 A | 12/1973 | Siclari et al. |
| 4,067,857 A | 1/1978 | Muntz |
| 4,100,142 A | 7/1978 | Schaefer et al. |
| 4,359,570 A | 11/1982 | Davis et al. |
| 4,377,669 A | 3/1983 | Zweifel et al. |
| 4,400,500 A | 8/1983 | Kelley et al. |
| 4,617,373 A | 10/1986 | Pruett et al. |
| 4,617,374 A | 10/1986 | Pruett et al. |
| 4,661,566 A | 4/1987 | Pruett et al. |
| 4,707,537 A | 11/1987 | Pruett et al. |
| 4,749,772 A | 6/1988 | Weaver et al. |
| 4,749,773 A | 6/1988 | Weaver et al. |
| 4,749,774 A | 6/1988 | Weaver et al. |
| 4,778,708 A | 10/1988 | Nishino et al. |
| 4,808,677 A | 2/1989 | Weaver et al. |
| 4,820,795 A | 4/1989 | Hirata et al. |
| 4,826,903 A | 5/1989 | Weaver et al. |
| 4,845,187 A | 7/1989 | Weaver et al. |
| 4,892,923 A | 1/1990 | Weaver et al. |
| 4,895,904 A | 1/1990 | Allingham |
| 4,981,516 A | 1/1991 | Kluger et al. |
| 4,999,418 A | 3/1991 | Krutak et al. |
| 5,008,230 A | 4/1991 | Nichols |
| 5,030,708 A | 7/1991 | Krutak et al. |
| 5,032,670 A | 7/1991 | Parham et al. |
| 5,057,594 A | 10/1991 | Krutak et al. |
| 5,064,935 A | 11/1991 | Jackson et al. |
| 5,068,348 A | 11/1991 | Weaver et al. |
| 5,091,501 A | 2/1992 | Weaver et al. |
| 5,106,942 A | 4/1992 | Krutak et al. |
| 5,153,164 A | 10/1992 | Mason |
| 5,162,488 A | 11/1992 | Mason |
| 5,166,311 A | 11/1992 | Nichols |
| 5,215,876 A | 6/1993 | Pruett et al. |
| 5,238,975 A | 8/1993 | Johnson et al. |
| 5,246,779 A | 9/1993 | Heimberg et al. |
| 5,254,288 A | 10/1993 | Verheijen et al. |
| 5,254,625 A | 10/1993 | Weaver et al. |
| 5,274,072 A | 12/1993 | Weaver et al. |
| 5,286,836 A | 2/1994 | Park et al. |
| 5,302,740 A | 4/1994 | Krutak et al. |
| 5,322,883 A | 6/1994 | Adyha et al. |
| 5,331,066 A | 7/1994 | Takanoo et al. |
| 5,368,968 A | 11/1994 | Wehrmann et al. |
| 5,372,864 A | 12/1994 | Weaver et al. |
| 5,374,419 A | 12/1994 | Krutak et al. |
| 5,376,650 A | 12/1994 | Weaver et al. |
| 5,382,474 A | 1/1995 | Adhya et al. |
| 5,384,377 A | 1/1995 | Weaver et al. |
| 5,401,438 A | 3/1995 | Otsuka |
| 5,416,187 A | 5/1995 | Kuo et al. |
| 5,419,936 A | 5/1995 | Tindale |
| 5,428,126 A | 6/1995 | Kashima et al. |
| 5,442,086 A | 8/1995 | Krutak et al. |
| 5,453,479 A | 9/1995 | Borman et al. |
| 5,456,725 A | 10/1995 | Bruhnke |
| 5,459,224 A | 10/1995 | Pruett et al. |
| 5,466,765 A | 11/1995 | Haseltine et al. |
| 5,523,381 A | 6/1996 | Ueberdiek et al. |
| 5,532,332 A | 7/1996 | Weaver et al. |
| 5,597,891 A | 1/1997 | Nelson et al. |
| 5,681,918 A | 10/1997 | Adams et al. |
| 5,714,262 A | 2/1998 | Stouffer et al. |

(Continued)

FOREIGN PATENT DOCUMENTS

DE   10148702 A1   4/2003

(Continued)

OTHER PUBLICATIONS

Chinese Office Action dated Sep. 7, 2007 received on Chinese Application No. 200480019611.5.

(Continued)

*Primary Examiner*—Kriellion A Sanders
(74) *Attorney, Agent, or Firm*—Michael K. Carrier; Bernard J. Graves, Jr.

(57) ABSTRACT

A method for incorporating a UV light absorbing compound into a polyester prepared using direct esterification of reactants selected from a dicarboxylic acid and a diol. The method comprises reacting the reactants in an esterifying reactor under conditions sufficient to form an esterified product including at least one of an ester, an oligomer, or mixture having an ester and a mixture of low molecular weight polyester; polymerizing the esterified product in a polycondensation reactor to form a polyester; and adding the UV absorbing compound to the esterified products when at least 50% of the carboxy groups initially present in the reactants have been esterified to obtain a yield of UV absorbing compound incorporated into the polyester of greater than 25%. Articles utilizing the UV protected polyester prepared by the method of the invention are additionally disclosed.

26 Claims, No Drawings

U.S. PATENT DOCUMENTS

| | | |
|---|---|---|
| 5,714,570 A | 2/1998 | Kim et al. |
| 5,854,377 A | 12/1998 | Braune |
| 5,869,543 A | 2/1999 | Boos et al. |
| 5,898,058 A | 4/1999 | Nichols et al. |
| 5,898,059 A | 4/1999 | Trojan |
| 5,981,690 A | 11/1999 | Lustig et al. |
| 5,985,389 A | 11/1999 | Dalton et al. |
| 6,001,952 A | 12/1999 | Carman et al. |
| 6,020,421 A | 2/2000 | Fukushima et al. |
| 6,071,612 A | 6/2000 | Roderiguez et al. |
| 6,099,778 A | 8/2000 | Nelson et al. |
| 6,100,369 A | 8/2000 | Miyajima et al. |
| 6,132,825 A | 10/2000 | Frisk |
| 6,159,406 A | 12/2000 | Shelby et al. |
| 6,166,170 A | 12/2000 | Putzig |
| 6,200,659 B1 | 3/2001 | Fujimori et al. |
| 6,207,740 B1 | 3/2001 | Zhao et al. |
| 6,265,533 B1 | 7/2001 | Regel et al. |
| 6,277,947 B1 | 8/2001 | Kelsey et al. |
| 6,316,584 B1 | 11/2001 | Seidel et al. |
| 6,350,851 B1 | 2/2002 | Inada et al. |
| 6,358,578 B1 | 3/2002 | Otto et al. |
| 6,380,348 B1 | 4/2002 | Cannon et al. |
| 6,384,180 B1 | 5/2002 | Jernigan et al. |
| 6,417,320 B1 | 7/2002 | Otto et al. |
| 6,506,853 B2 | 1/2003 | Duan |
| 6,541,598 B2 | 4/2003 | Duan et al. |
| 6,559,216 B1 | 5/2003 | Zhao et al. |
| 6,569,991 B2 | 5/2003 | Nichols et al. |
| 6,590,069 B2 | 7/2003 | Nichols et al. |
| 6,599,596 B2 | 7/2003 | Nichols et al. |
| 6,604,848 B2 | 8/2003 | Tanaka et al. |
| 6,703,474 B2 | 3/2004 | Fujimori et al. |
| 6,716,898 B2 | 4/2004 | Weaver et al. |
| 6,720,382 B2 | 4/2004 | Leugs et al. |
| 6,723,826 B2 | 4/2004 | Yamaguchi et al. |
| 6,780,916 B2 | 8/2004 | Tung et al. |
| 6,787,589 B2 | 9/2004 | Weaver et al. |
| 6,787,630 B1 | 9/2004 | Dominguez De Walter et al. |
| 6,803,082 B2 | 10/2004 | Nichols et al. |
| 6,841,604 B2 | 1/2005 | Bayer et al. |
| 6,852,388 B2 | 2/2005 | Murschall et al. |
| 7,282,555 B2 | 10/2007 | Weaver et al. |
| 2002/0010310 A1 | 1/2002 | Allen et al. |
| 2002/0137879 A1 | 9/2002 | Ohmatsuzawa et al. |
| 2003/0018115 A1 | 1/2003 | Massey et al. |
| 2003/0045672 A1 | 3/2003 | Duan et al. |
| 2003/0073771 A1 | 4/2003 | Sanders et al. |
| 2003/0078326 A1 | 4/2003 | Zhao et al. |
| 2003/0078328 A1 | 4/2003 | Mason et al. |
| 2003/0136949 A1 | 7/2003 | Danielson et al. |
| 2003/0144459 A1 | 7/2003 | Fujimori et al. |
| 2004/0236063 A1 | 11/2004 | Suzuki et al. |
| 2004/0236065 A1 | 11/2004 | Denis et al. |
| 2005/0008885 A1 | 1/2005 | Blakely et al. |
| 2005/0010017 A1 | 1/2005 | Blakely et al. |

FOREIGN PATENT DOCUMENTS

| | | |
|---|---|---|
| EP | 0 273 280 | 7/1988 |
| EP | 0 326 287 | 8/1989 |
| EP | 0368637 A1 | 5/1990 |
| EP | 0421928 A2 | 4/1991 |
| EP | 0436320 A2 | 7/1991 |
| EP | 0854127 A1 | 7/1998 |
| JP | 1995258394 A | 10/1995 |
| WO | WO 01/21680 A1 | 3/2001 |
| WO | WO 02/18472 A2 | 3/2002 |
| WO | WO 02/46286 A2 | 6/2002 |
| WO | WO 2004/078840 A2 | 9/2004 |
| WO | WO 2005/007735 | 1/2005 |

OTHER PUBLICATIONS

The Communication Relating to the Results of the Partial International Search on PCT/US2004/020645.
Office Action dated Jan. 2, 2008 in U.S. Appl. No. 10/855,723.
Office Action dated Jun. 20, 2007 in U.S. Appl. No. 10/855,723.
Office Action dated Jan. 2, 2008 in U.S. Appl. No. 10/618,274.
Office Action dated Jun. 20, 2007 in U.S. Appl. No. 10/618,274.
Office Action dated May 17, 2006 in U.S. Appl. No. 10/618,274.
Office Action dated Dec. 12, 2005 in U.S. Appl. No. 10/618,274.

PROCESS FOR ADDING METHINE UV LIGHT ABSORBERS TO PET PREPARED BY DIRECT ESTERIFICATION

BACKGROUND OF THE INVENTION

1. Field of the Invention

The present invention relates to a process for incorporating an ultraviolet (UV) light absorber into a polyester or copolyester composition. More particularly, the present invention relates to a process for incorporating a UV light absorber into a polyester prepared using direct esterification of a dicarboxylic acid and a diol.

2. Background of the Invention

Polyester is a polymeric resin widely used in a number of packaging and fiber based applications. Commercial polyester production, in general, involves direct esterification, where the desired glycol, in molar excess, is reacted with an aromatic dicarboxylic acid to form an ester; or by transesterification or ester exchange if the starting aromatic moiety is a low molecular weight diester of an aromatic dicarboxylic acid, such as dimethyl terephthalate (DMT) which is polycondensed under reduced pressure and at elevated temperatures form to poly(ethylene terephthalate) (PET). Since the product of these condensation reactions tend to be reversible and in order to increase the molecular weight of the polyesters, this reaction is often carried out in a multi-chamber polycondensation reaction system having several reaction chambers operating in series. In the case where the starting aromatic moiety is an aromatic dicarboxylic acid, water is the by-product of the reaction. In the case where the starting aromatic moiety is a diester of an aromatic dicarboxylic acid, such as DMT, methanol is the by-product of the reaction. In either case, the reaction by-product is removed by distillation.

The diglycol ester then passes to the second, prepolymerization step to form intermediate molecular weight oligomers before passing to the third, melt polyesterification step or polycondensation step operated at low pressure and high temperature. The molecular weight of the polymer chain continues to increase in this second chamber with volatile compounds being continually removed. This process is repeated successively for each reactor, with each successive reactor being operated at lower and lower pressures. The result of this step wise condensation is the formation of polyester with high molecular weight and a higher inherent viscosity relative to the esterification step. For some applications requiring yet higher melt viscosity, solid-state polymerization is practiced.

Poly(ethylene terephthalate) or a modified PET is the polymer of choice for making beverage and food containers such as plastic bottles and jars used for carbonated beverages, water, juices, foods, detergents, cosmetics, and other products. However, many of these products are deleteriously affected, i.e., degraded, by ultraviolet (UV) light at wavelengths in the range of approximately 250 to 390 nanometers (nm). It is well known that polymers can be rendered resistant to UV light degradation by physically blending in such polymers various UV light stabilizers such as benzophenones, benzotriazoles and resorcinol monobenzoates. Although these stabilizers function well to absorb radiation, many of these compounds would decompose under the conditions at which polyesters are manufactured or processed. Decomposition of such stabilizers frequently causes yellow discoloration of the polyester and results in the polyester containing little, if any, of the stabilizer.

U.S. Pat. No. 4,617,374 to Pruett et al. discloses the use of certain UV-absorbing methine compounds that may be incorporated into the polyester or a polycarbonate composition. These UV absorbing compounds have been found to be useful in the preparation of polyesters such as poly(ethylene terephthalate) and copolymers of poly(ethylene terephthalate) and poly(1,4-cyclohexylenedimethylene terephthalate). The compounds enhance ultraviolet or visible light absorption with a maximum absorbance within the range of from about 320 nm to about 380 nm. Functionally, these compounds contain an acid or ester group which condenses onto the polymer chain as a terminator. Pruett et al. teach preparing the polyester using transesterification, i.e., where DMT is a starting material, and adding the UV absorbing compound at the beginning of the process. However, it has been unexpectedly discovered that the process by which the polyester is prepared and the point at which the UV absorbing compound is add to the polyester contributes to the efficiency at which such UV absorbing compound(s) are incorporated into the polyester. It has been discovered that these UV absorbing compounds are not readily incorporated into the polyester prepared using direct esterification as described above. The loss of UV absorbing compounds results in added costs for the polyester formation.

U.S. Pat. Nos. 6,207,740 and 6,559,216 to Zhao et al. discloses certain polyoxyalkylenated methine-based compounds are suitable for use as UV absorbing compounds in thermoplastics. These patents teach that such polyoxyalkylenated methine-based compounds are normally liquid and may be blended with already polymerized themoplastics, such as polyesters, polyolefins, halogenated polymers, and polyamides. However, the patents do not disclose or provide a fair suggestion as to if or when such polyoxyalkylenated methine-based compounds could be incorporated into the polyester composition during the manufacture and particularly if the polyester is made utilizing direct esterification of a diacid and a diol.

Accordingly, there is a need for improved methods of incorporating UV absorbing compounds, into polyester compositions made using the method of direct esterification, and particularly UV absorbing compounds those of the type described in U.S. Pat. No. 4,617,374.

SUMMARY OF THE INVENTION

Briefly, the present invention is a method for incorporating greater than 25% of the UV light absorbing compound into a polyester prepared using direct esterification process. The process includes the steps of directly esterifying reactants comprising a dicarboxylic acid and a diol by contacting the reactants under conditions sufficient to form an esterified product comprising at least one of: an ester, an oligomer, a low molecular weight polyester and mixtures thereof; subjecting the esterified product to polycondensation to form a polyester; and adding at least one UV absorbing compound to one of the reactors when at least 50 percent of the carboxy groups initially present in the reactants have been esterified. In a preferred embodiment, from 0 to 100% of the desired amount of UV absorbing compound is added during one or more polycondensation steps wherein high molecular weight polyester may be prepared by subjecting the esterified products from the esterification reactor to a plurality of polycondensation zones of increasing vacuum and temperature.

Accordingly, it is an object of the present invention to incorporate a UV absorbing compound into a polyester prepared utilizing direct esterification of a diacid and a diol. It is another object of the present invention to incorporate a UV absorbing compound into a polyester prepared utilizing direct esterification of a diacid and a diol wherein the yield of UV absorbing compound incorporated into the polyester is greater than 50%.

These and other objects and advantages of the present invention will become more apparent to those skilled in the art in view of the following description. It is to be understood that the inventive concept is not to be considered limited to the constructions disclosed herein but instead by the scope of the appended claims.

DETAILED DESCRIPTION OF THE INVENTION

The polyesters which may be used in accordance with the present invention include linear, thermoplastic, crystalline or amorphous polyesters produced by direct esterification and polymerization techniques from reactants selected from one or more dicarboxylic acids and one or more diols. As used herein, the term "polyester" is used generally and includes homopolymers and copolymers. For example, a mixture of dicarboxylic acids, preferably aromatic dicarboxylic acids, and one or more diols may be heated in the presence of esterification and/or polyesterification catalysts at temperatures in the range of about 150° to about 300° C. and pressures of atmospheric to about 0.2 mm mercury. Normally, the dicarboxylic acid is esterified with the diol(s) at atmospheric pressure and at a temperature at the lower end of the specified range. The polyesters normally are molding or fiber grade and have an intrinsic viscosity (IV) of about 0.4 to about 1.2 dL/g, as measured in accordance with ASTM method D4603-03, using a solution of 0.25 grams of polymer dissolved in 25 ml of a solvent solution comprised of 60 weight % phenol and 40 weight % 1,1,2,2,-tetrachloroethane at 25° C.

The preferred polyesters comprise at least about 50 mole percent terephthalic acid residues and at least about 50 mole percent ethylene glycol and/or 1,4-cyclohexanedimethanol residues, wherein the acid component has 100 mole % and the diol component has 100 mole %. Particularly preferred polyesters are those containing from about 75 to 100 mole percent terephthalic acid residues and from about 75 to 100 mole percent ethylene glycol residues, wherein the acid component has 100 mole % and the diol component has 100 mole %. As used herein, "residue" means the portion of a compound that is incorporated into a polyester composition after polycondensation.

Direct esterification processes are well known to those skilled in the art and include such processes described in U.S. Pat. Nos. 4,100,142; 3,781,213; and 3,689,481, the entire disclosures of which are incorporated herein by reference.

In one embodiment of the present invention, polyesters of suitable quality may be prepared in a continuous manner by directly esterifying the dicarboxylic acid with the glycol in an esterification reactor operated at a pressure above the partial vapor pressure of the glycol and at a reaction temperature sufficient to allow the continuous removal of water from the esterification reaction, continuing the esterification for a time sufficient to form esterification products and adding the UV absorbing compounds to the esterified products when at least 50% of the carboxy groups initially present in the dicarboxylic acid reactant is esterified. Accordingly, the UV absorbing compound may added to the esterification reactor(s), the polycondensation reactor(s) or a combination of both esterification and polycondensation reactor(s). Such esterification products are well known to those skilled in the art and include at least one of: an ester, an oligomer, a low molecular weight polyester and mixtures thereof. An important aspect of the present invention is that at least 50% of the carboxy groups initially present in the dicarboxylic acid be esterified before the UV absorbing compound(s) is/are added to the esterification products. Desirably, at least about 70%, preferably at least about 80%, more preferably at least about 85% and most preferably greater than about 90% of the carboxy groups initially present in the reactants are esterified before the UV absorbing compounds are added to the esterified products.

Accordingly, the amount of UV absorbing compound that may be added to the esterification reactor can range from 0 to 100% of the desired amount to be incorporated into the polyester. Preferably, the amount of UV absorbing compound added to the esterification reactor is from 0 to about 80% with the remaining amount added in the polycondensation reactor. More preferably, the amount added to the esterification reactor is from 0 to about 50% of the UV absorbing compound with the remaining amount added to the polycondensation reactor. It is understood that the amounts or quantitative ranges used herein includes not only those amounts expressly specified, but would also includes ranges therein. One skilled in the art will recognize that the amount of UV absorbing compound added to the reactor and the desired amount to be incorporated into the polyester may be different and depends upon the yield of the UV absorbing compound incorporated into the polyester.

It has been discovered that the amount of UV absorbing compound that may be added during the esterification reaction process and have a yield greater than 25% is directly proportional to the percentage of esterified carboxy groups initially present in the reactants. That is, as the amount of esterified products present in the esterification reaction process increases, an increasing amount of UV absorbing compounds can be added to the esterification reactor(s) without deleterious effects on the UV absorbing compounds. However, at least 50% of the carboxy groups initially present in the reactants should be esterified before any amount of UV absorbing compounds are added to the esterification reactor.

Following esterification, high molecular weight polyester may be prepared using any known polycondensation process wherein the esterification products prepared in the esterification reactor are passed through a plurality of zones of increasing vacuum and temperature terminating, for example, with a polymer finisher operating under a vacuum of about 0.1 to 10 mm Hg at a temperature of about 270° to 310° C. One skilled in the art will understand that such zones may be incorporated into a single reactor having a plurality of distinct operational zones, each of which have a distinct operating temperature, pressure and residence time or such zones may be represented by a plurality of distinct polycondensation reactors operated in series such that the polyester mixture is progressively polymerized in the melt phase where the polyester removed from the last reaction chamber has an inherent viscosity of from about 0.1 to about 0.75 dL/g, measured in accordance with the method described above.

In accordance with the present invention, from 0 to 100% of the desired amount of UV absorbing compound to be incorporated into the polyester may be added to the polycondensation reactor during any stage of polycondensation. Preferably, the amount of UV absorbing compound that may be added to the polycondensation reactor during polycondensation is greater than 50%, more preferably greater than 80%, and most preferably greater than 95%. Although not to be bound to any theory, it is believed that the water evolved during esterification deleterious effects the UV absorber and reduces the yield of UV absorbing compound incorporated into the polyester. Thus, the light absorbing compound may be added to the esterification reactor(s) when at least 50 percent of the carboxy groups initially present in the reactants have been esterified, or desirably may be added to the polycondensation reactor(s) at any stage during polycondensation since the material in the polycondensation reactor generally has greater than 90 percent of the carboxy groups esterified. Alternatively, a portion of the UV absorbing compound can be added to the esterified products in the esterification reactor(s) and the balance of the UV absorbing compound is added to the PET in the polycondensation reactor(s).

Adding the UV absorbing compound in accordance with the present invention provides a yield of UV absorbing compound incorporated into the polyester of greater than 25%, preferably greater than 40%, more preferably greater than 50%, and most preferably greater than about 75%. As used herein, "yield" is the percent value of the amount of UV absorbing compound or residue(s) thereof present in the polyester divided by the amount of UV absorbing compound(s) added to the process per unit of polymer.

The concentration of the UV absorbing compound, or its residue, in the condensation polymer can be varied substantially depending on the intended function of the UV-absorbing residue and/or the end use of the polymer composition. For example, when the polymer composition is for fabricating relatively thin-walled containers, the concentration of the UV absorbing compound will typically be in the range of from about 50 to 1500 ppm (measured in parts by weight UV absorber per million parts by weight polymer) with the range of about 200 to 800 ppm being preferred. Concentrations of UV absorbers may be increased to levels of from about 0.01 to about 5.0% if it is desired for the polymers containing these UV light absorbing compounds to have improved resistance to weathering and/or when the polymers or fibers made therefrom are dyed with disperse dyes. Polymer compositions containing substantially higher amounts of the UV absorbing compound, or its residues, e.g., from about 2.0 to 10.0 weight percent, may be used as polymer concentrates. Such concentrates may be blended with the same or different polymer according to conventional procedures to obtain polymer compositions which will contain a predetermined amount of the residue or residues in a non-extractable form.

The polyesters that are suitable for incorporating the UV absorbers in accordance with the method of the present invention are polyesters formed by the direct reaction of a dicarboxylic acid with a diol. The diacid component can be selected from aliphatic, alicyclic, or aromatic dicarboxylic acids. Suitable diacid components may be selected from terephthalic acid; naphthalene dicarboxylic acid; isophthalic acid; 1,4-cyclohexanedicarboxylic acid; 1,3-cyclohexanedicarboxylic acid; succinic acid; glutaric acid; adipic acid; sebacic acid; and 1, 12-dodecanedioic acid. Preferably, the diacid component is terephthalic acid.

The diol component of the polyester may be selected from ethylene glycol; 1,4-cyclohexanedimethanol; 1,2-propanediol; 1,3-propanediol; 1,4-butanediol; 2,2-dimethyl-1,3-propanediol; 1,6-hexanediol; 1,2-cyclohexanediol; 1,4-cyclohexanediol; 1,2-cyclohexanedimethanol; 1,3-cyclohexanedimethanol; 2,2,4,4-tetramethyl-1,3-cyclobutane diol; X,8-bis(hydroxymethyl)tricyclo-[5.2.1.0]-decane wherein X represents 3, 4, or 5; diols containing one or more oxygen atoms in the chain, e.g., diethylene glycol, triethylene glycol, dipropylene glycol, tripropylene glycol; diols containing from about 2 to about 18, preferably 2 to 12 carbon atoms in each aliphatic moiety and mixtures thereof. Cycloaliphatic diols can be employed in their cis or trans configuration or as mixtures of both forms. Preferred diols includes ethylene glycol; diethylene glycol; 1,4-cyclohexanedimethanol; and mixtures thereof. In many cases, the diol may comprise a major amount of ethylene glycol and modifying amounts cyclohexanedimethanol and/or diethylene glycol.

The terephthalic acid and ethylene glycol may be fed separately into the esterification reactor. However, an economic benefit is realized by the employment of a single feed line supplying terephthalic acid and ethylene glycol to the esterification reactor. The duplication of feed system and pressure regulation problems with separate glycol and acid feed lines are eliminated with the employment of a single reactant feed system. It has been found that for substantially complete esterification of the dicarboxylic acid component in the reaction mixture, i.e., greater than 90%, an excess quantity of diol over the stoichiometric quantity is required. A diol/diacid ratio in the range of about 1.01:1 to 2.5:1, respectively, is desirable. Certainly, a greater excess of glycol would be operable, but would be uneconomical. With the employment of the self-compensating primary esterification unit, coupled with the fact that esterification and low molecular weight oligomer formation proceed nearly simultaneously, a relatively low molar ratio of diol/diacid of the order of 1.1:1 to 1.8:1, respectively is preferred. Optionally, a paste or slurry may be prepared from terephthalic acid/ethylene glycol in the molar ratio of about 1.2:1 to 1.4:1, respectively, and preferably about 1.3:1, respectively, to be pumped under an applied pressure to the esterification reactor.

The UV light absorbing compound can be added to the esterification reactor and/or polycondensation reactor using known methods for the addition of such additives. For example, the UV light absorbing compound may be added directly to the reactors via a separate feed line or may be mixed with any type of fluid that is compatible with a polyester process. The UV light absorbing compound can be a dilute solution or a concentrated dispersion or slurry that is capable of being pumped directly into the reactor or may be added to a carrier stream, such as one or more of the reactant or recycle streams. As one skilled in the art will understand, the singular term "reactor" can include a single reactor or a plurality of reactors, with each reactor having one or more reaction zones. Moreover, the term "reactor" can further include feed points that are physically located outside of the reactor, such as, for example, at a pump inlet or discharge, a recirculation line, a reflux point, as well as one or more points in associated piping and transfer equipment. For example, a side stream of products may be removed from the PET esterification or polycondensation process(es), the UV absorbing compound would be admixed with the contents of the side stream, which would then be returned to the reactor. However, the term "reactor" is used herein for the sake of brevity and clarity of description.

The UV absorbers used in the method of this embodiment are disclosed in U.S. Pat. Nos. 4,617,374; 4,707,537; 4,749,773; 4,749,774; 4,826,903; 4,845,187; 5,254,625; 5,459,224; 5,532,332; 6,207,740; and 6,559,216; and U.S. patent application publications 2003/0078326 and 2003/0078328, the entire disclosures of which are hereby incorporated by reference. The UV absorbers are characterized by having at least one 4-oxybenzylidene radical of Formula I present:

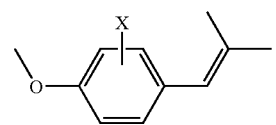

wherein X is hydrogen or up to two moieties selected from the group consisting of hydroxy, $C_1$-$C_6$ alkyl, $C_1$-$C_6$ alkoxy and halogen, and wherein the UV absorbing compound includes a polyester reactive group.

Preferred compounds useful in the practice of the invention which contain the moiety of Formula I include one or more of the compounds represented by Formulae II-VII below:

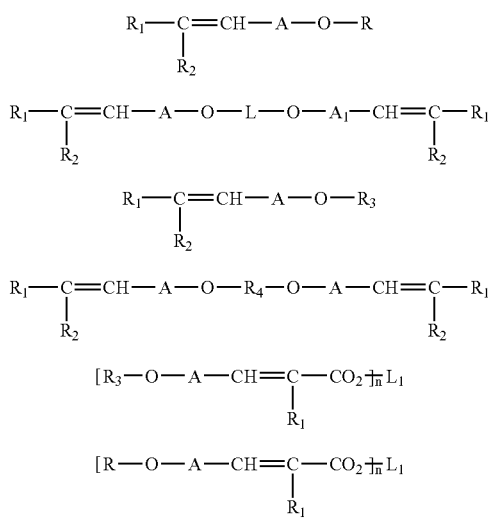

wherein:

R is selected from the group consisting of hydrogen, $C_1$-$C_{12}$-alkyl, substituted $C_1$-$C_{12}$-alkyl, aryl, $C_3$-$C_8$-cycloalkyl, $C_3$-$C_8$-alkenyl and —(CHR'CHR"O—)$_p$CH$_2$—CH$_2$-R$_5$.

R' and R" are independently selected from the group consisting of hydrogen and $C_1$-$C_{12}$ alkyl;

n is a whole number ranging from 2 to 4;

$R_1$ is selected from the group consisting of —CO$_2$R$_6$ and cyano;

$R_2$ is selected from the group consisting of cyano, —CO$_2$R$_6$, $C_1$-$C_6$-alkylsulfonyl, arylsulfonyl, carbamoyl, $C_1$-$C_6$-alkanoyl, aroyl, aryl, and heteroaryl;

$R_3$ is selected form the group consisting of —COR$_7$, —CON(R$_7$)R$_8$ and —SO$_2$R$_7$;

$R_4$ is selected from the group consisting of:

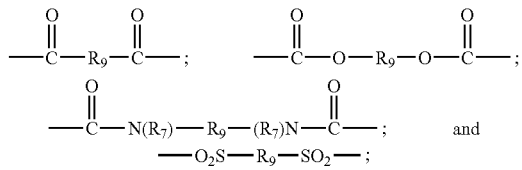

$R_5$ is selected from the group consisting of hydrogen, hydroxy, $C_1$-$C_6$-alkoxy, $C_1$-$C_6$-alkanoyloxy and aryloxy;

$R_6$ is selected from the group consisting of hydrogen, $C_1$-$C_{12}$-alkyl, substituted $C_1$-$C_{12}$-alkyl, —(CHR'CHR"O—)$_p$ CH$_2$CH$_2$R$_5$, $C_3$-$C_8$-alkenyl, $C_3$-$C_8$-cycloalkyl, aryl, and cyano;

$R_7$ is selected from the group consisting of $C_1$-$C_6$-alkyl, $C_3$-$C_8$-cycloalkyl and aryl;

$R_8$ is selected from the group consisting of hydrogen, $C_1$-$C_6$-alkyl, $C_3$-$C_8$-cycloalkyl and aryl;

$R_9$ is selected from the group consisting of $C_1$-$C_{12}$-alkylene, arylene and $C_3$-$C_8$-cycloalkylene, and —(CHR'CHR"O—)$_p$CHR'CHR"—;

L is a divalent organic linking groups bonded by non-oxo carbon atoms;

$L_1$ is a di, tri, or tetravalent linking group, where the divalent radical is selected from the group consisting of $C_2$-$C_{12}$-alkylene, —(CHR'CHR"O—)$_p$CHR'CHR"—, $C_1$-$C_2$-alkylene-arylene-$C_1$-$C_2$-alkylene, —CH$_2$CH$_2$O-arylene-OCH$_2$CH$_2$, and —CH$_2$-1,4-cyclohexylene-CH$_2$—; where the trivalent and tetravalent radicals are selected from the group consisting of $C_3$-$C_8$ aliphatic hydrocarbon having three or four covalent bonds. Examples of trivalent and tetravalent radicals include —CH(—CH$_2$—)$_2$ and C(CH$_2$—)$_4$.

A and $A_I$ are independently selected from the group consisting 1,4-phenylene and 1,4-phenylene substituted with one or two groups selected from the group consisting of hydroxy, halogen, $C_1$-$C_6$-alkyl and $C_1$-$C_6$-alkoxy; with the proviso that at least one polyester reactive group is present on each of the UV absorbers of Formulae II-VII above.

More preferred 4-oxybenzylidene compounds include the following Formulae VIII-X:

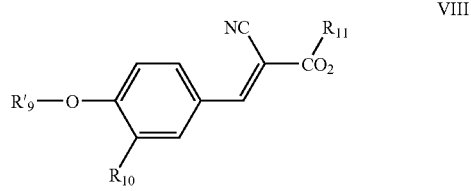

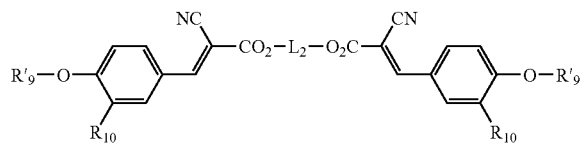

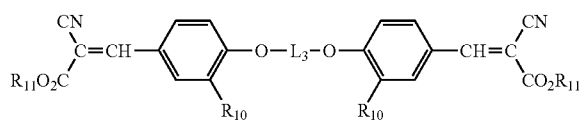

wherein:

$R'_9$ is selected from the group consisting of hydrogen, $C_1$-$C_6$-alkyl and —(CHR'CHR"O—)$_p$CH$_2$CH$_2$OR$_{12}$;

$R_{10}$ is selected from the group consisting of hydrogen and $C_1$-$C_6$-alkoxy;

$R_{11}$ is selected from the group consisting of $C_1$-$C_6$-alkyl, cyclohexyl, phenyl and —(CHR'CHR"O—)$_p$R$_{12}$;

$R_{12}$ is selected from the group consisting of hydrogen and $C_1$-$C_6$ alkyl;

$L_2$ is selected from the group consisting of $C_2$-$C_6$-alkylene, —(CH$_2$CH$_2$O)$_p$—CH$_2$CH$_2$— and —CH$_2$-cyclohexane-1,4-diyl-CH$_2$—; and $L_3$ is selected from the group consisting of $C_2$-$C_6$-alkylene, —(CH$_2$CH$_2$O)$_p$-CH$_2$CH$_2$— and $C_3$-$C_8$-alkenylene.

The most preferred UV absorber is represented by Formulae XI and XII:

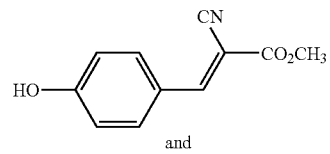

and

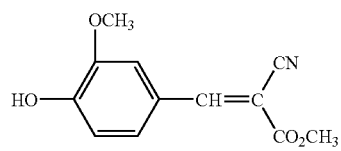

The alkoxylated moiety denoted herein by the formula —(CHR'CHR"O—)$_p$ has a chain length wherein p is from 1 to 100; preferably p is less than about 50; more preferably p is less than 8, and most preferably p is from 1-3. In a preferred embodiment the alkoxylated moiety comprises ethylene oxide residues, propylene oxide residues, or residues of both.

The term "$C_1$-$C_{12}$-alkyl" is used to denote an aliphatic hydrocarbon radical that contains one to twelve carbon atoms and is either a straight or a branched chain.

The term "substituted $C_1$-$C_{12}$-alkyl" is used to denote a $C_1$-$C_{12}$-alkyl radical substituted with 1-3 groups selected from the group consisting of the following: halogen, hydroxy, cyano, carboxy, succinimido, glutarimido, phthalimidino, phthalimido, 2-pyrrolidono, $C_3$-$C_8$-cycloalkyl, aryl, acrylamido, o-benzoicsulfimido, —SO$_2$N(R$_{13}$)R$_{14}$, —CON(R$_{13}$)R$_{14}$, R$_{13}$CON(R$_{14}$)—, R$_{15}$SO$_2$—, R$_{15}$O—, R$_{15}$S—, R$_{15}$SO$_2$N(R$_{13}$)—, —OCON(R$_{13}$)R$_{14}$, —CO$_2$R$_{13}$, R$_{13}$CO—, R$_{13}$OCO$_2$—, R$_{13}$CO$_2$—, aryl, heteroaryl, heteroarylthio, and groups having formula XIII:

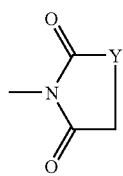

wherein:

Y is selected from the group consisting of $C_2$-$C_4$-alkylene; —O—, —S—, —CH$_2$O— and —N(R$_{13}$)—;

R$_{13}$ and R$_{14}$ are selected from the group consisting of hydrogen, $C_1$-$C_6$-alkyl, $C_3$-$C_8$-cycloalkyl, $C_3$-$C_8$-alkenyl, and aryl;

R$_{15}$ is selected from the group consisting of $C_1$-$C_6$-alkyl, $C_3$-$C_8$-cycloalkyl, $C_3$-$C_8$-alkenyl and aryl.

The term "$C_1$-$C_6$-alkyl" is used to denote straight or branched chain hydrocarbon radicals and these optionally substituted, unless otherwise specified, with 1-2 groups selected from the group consisting of hydroxy, halogen, carboxy, cyano, aryl, aryloxy, arylthio, $C_3$-$C_8$-cycloalkyl, $C_1$-$C_6$-alkoxy, $C_1$-$C_6$-alkylthio; $C_1$-$C_6$-alkylsulfonyl; arylsulfonyl; $C_1$-$C_6$-alkoxycarbonyl, and $C_1$-$C_6$-alkanoyloxy.

The terms "$C_1$-$C_6$-alkoxy", "$C_1$-$C_6$-alklythio", "$C_1$-$C_6$-alkylsulfonyl", "$C_1$-$C_6$-alkoxycarbonyl", "$C_1$-$C_6$-alkoxycarbonyloxy", "$C_1$-$C_6$-alkanoyl", and "$C_1$-$C_6$-alkanoyloxy" denote the following structures, respectively: —OC$_1$-$C_6$-alkyl, —S—C$_1$-$C_6$-alkyl, —O$_2$S—C$_1$-$C_6$-alkyl, —CO$_2$—C$_1$-$C_6$-alkyl, —OCO$_2$C$_1$-$C_4$-alkyl, —OC—C$_1$-$C_6$-alkyl, and —OCO—C$_1$-$C_6$-alkyl wherein the C$_1$-$C_6$-alkyl groups may optionally be substituted with up to two groups selected from hydroxy, halogen, cyano, aryl, —OC$_1$-$C_4$-alkyl, —OCOC$_1$-$C_4$-alkyl and —CO$_2$C$_1$-$C_4$-alkyl, wherein the C$_1$-$C_4$-alkyl portion of the groups represents a saturated straight or branched chain hydrocarbon radical that contains one to four carbon atoms.

The terms "$C_3$-$C_8$-cycloalkyl" and "$C_3$-$C_8$-alkenyl" are used to denote saturated cycloaliphatic radicals and straight or branched chain hydrocarbon radicals containing at least one carbon-carbon double bond, respectively, with each radical containing three to eight carbon atoms.

The terms "$C_1$-$C_{12}$-alkylene", "$C_2$-$C_6$-alkylene" and "$C_1$-$C_2$-alkylene" denote straight or branched chain divalent hydrocarbon radicals containing one to twelve, two to six, and one to two carbon atoms, respectively, and these optionally substituted with one or two groups selected from hydroxy, halogen, aryl and $C_1$-$C_6$-alkanoyloxy.

The term "$C_3$-$C_8$-alkenylene" is used to denote a divalent straight or branched chain hydrocarbon radical that contains at least one carbon-carbon double bond and with each radical containing three to eight carbon atoms.

The term "$C_3$-$C_8$-cycloalkylene" denotes a $C_3$ to $C_8$ divalent hydrocarbon radical having from three to eight carbon atoms, optionally substituted with one or two groups selected from hydroxy, halogen, aryl and $C_1$-$C_6$-alkanoyloxy.

In the terms "aryl", "aryloxy", "arylthio", arylsulfonyl" and "aroyl" the aryl groups or aryl portions of the groups are selected from phenyl and naphthyl, and these may optionally be substituted with hydroxy, halogen, carboxy, $C_1$-$C_6$-alkyl, $C_1$-$C_6$-akoxy and $C_1$-$C_6$-alkoxycarbonyl.

In the terms "heteroaryl" and "heteroarylthio" the heteroaryl groups or heteroaryl portions of the groups are mono or bicyclo heteroaromatic radicals containing at least one heteroatom selected from the group consisting of oxygen, sulfur and nitrogen or a combination of these atoms, in combination with carbon to complete the aromatic ring. Examples of suitable heteroaryl groups include: furyl, thienyl, benzothiazoyl, thiazolyl, isothiazolyl, pyrazolyl, pyrrolyl, thiadiazolyl, oxadiazolyl, benzoxazolyl, benzimidazolyl, pyridyl, pyrimidinyl and triazolyl and such groups substituted with 1-2 groups selected from $C_1$-$C_6$-alkyl, $C_1$-$C_6$-alkoxy, $C_3$-$C_8$-cycloalkyl, cyano, halogen, carboxy, $C_1$-$C_6$-alkoxycarbonyl, aryl, arylthio, aryloxy and $C_1$-$C_6$-alkylthio.

The term "halogen" is used to include fluorine, chlorine, bromine and iodine.

The term "carbamoyl" is used to represent the group having the formula: —CON(R$_{13}$)R$_{14}$, wherein R$_{13}$ and R$_{14}$ are as previously defined.

The term "arylene" is used to represent 1,2-; 1,3-: 1,4-phenylene and these radicals optionally substituted with 1-2 groups selected from $C_1$-$C_6$-alkyl, $C_1$-$C_6$-alkoxy and halogen.

The above divalent linking groups L and L$_1$ can be selected from a variety of divalent hydrocarbon moieties including: $C_1$-$C_{12}$-alkylene, —(CHR'CHR"O—)$_p$CH$_2$CH$_2$—, $C_3$-$C_8$-cycloalkylene, —CH$_2$—C$_3$-$C_8$-cycloalkylene —CH$_2$— and $C_3$-$C_8$-alkenylene. The $C_1$-$C_{12}$ alkylene linking groups may contain within their main chain heteroatoms, e.g. oxygen, sulfur and nitrogen and substituted nitrogen [—N(R$_{13}$)—], wherein R$_{13}$ is as previously defined, and/or cyclic groups such as $C_3$-$C_8$-cycloalkylene, arylene, divalent heretoaromatic groups or ester groups such as:

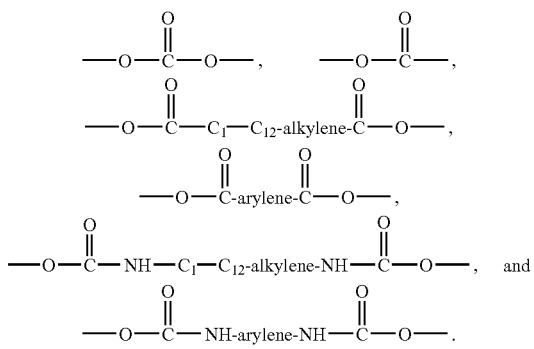

Some of the cyclic moieties which may be incorporated into the $C_1$-$C_{12}$-alkylene chain of atoms include:

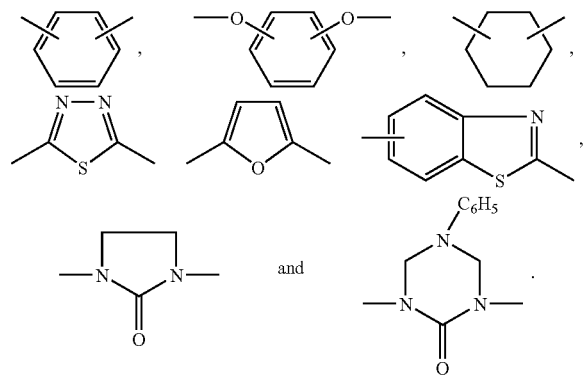

Examples of additional divalent heteroarylene linking groups include unsubstituted and substituted triazines such as 1,3,5-triazin-2,4-diyl, 6-methoxy-1,3,5-triazin-2,4-diyl and the group having formula XIV:

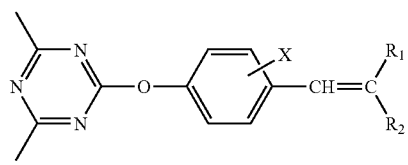

XIV wherein X, $R_1$ and $R_2$ are as defined previously.

The skilled artisan will understand that each of the references herein to groups or moieties having a stated range of carbon atoms such as $C_1$-$C_4$-alkyl, $C_1$-$C_6$-alkyl, $C_1$-$C_{12}$-alkyl, $C_3$-$C_8$-cycloalkyl, $C_3$-$C_8$-alkenyl, $C_1$-$C_{12}$-alkylene, $C_2$-$C_6$-alkylene, etc. includes moieties of all of the number of carbon atoms mentioned within the ranges. For example, the term "$C_1$-$C_6$-alkyl" includes not only the $C_1$ group (methyl) and $C_6$ group (hexyl) end points, but also each of the corresponding $C_2$, $C_3$, $C_4$, and $C_5$ groups including their isomers. In addition, it will be understood that each of the individual points within a stated range of carbon atoms may be further combined to describe subranges that are inherently within the stated overall range. For example, the term "$C_3$-$C_8$-cycloalkyl" includes not only the individual cyclic moieties $C_3$ through $C_8$, but also contemplates subranges such as $C_4$-$C_6$-cycloalkyl.

The term "polyester reactive group" is used herein to describe a group which is reactive with at least one of the functional groups from which the polyester is prepared under polyester forming conditions. Examples of such groups are hydroxy, carboxy, $C_1$-$C_6$-alkoxycarbonyl, $C_1$-$C_6$-alkoxycarbonyloxy and $C_1$-$C_6$-alkanoyloxy and the like.

One skilled in the art will understand that various thermoplastic articles can be made here excellent UV protection of the contents would be important. Examples of such articles include bottles, storage containers, sheets, films, fibers, plaques, hoses, tubes, syringes, and the like. Basically, the possible uses for polyester having a low-color, low-migratory UV absorber is voluminous and cannot easily be enveloped.

The present invention is illustrated in greater detail by the specific examples presented below. It is to be understood that these examples are illustrative embodiments and are not intended to be limiting of the invention, but rather are to be construed broadly within the scope and content of the appended claims.

COMPARATIVE EXAMPLE 1

Polyester oligomer was prepared by adding the UV absorbing compound to the esterification reactor at the initiation of the esterification reaction. To prepare the polyester oligomer the following reactants were mixed together in a stainless steel beaker: 651.35 g of purified terephthalic acid (3.92 moles); 13.29 g of purified isophthalic acid (0.08 moles); 397.25 g of virgin ethylene glycol (6.40 moles); 0.23 g of antimony trioxide, and 0.309 g of UV absorbing compound which theoretically will provide a concentration of 400 parts of absorbing compound to 1,000,000 parts of polymer. The UV absorbing compound had the following the formula:

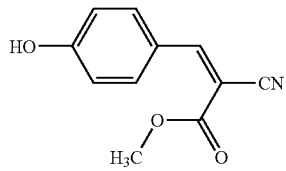

and was prepared in accordance with U.S. Pat. No. 4,617,374. The reactants were mixed using a 2-inch radius paddle stirrer connected to an electric motor to form a paste. After approximately ten minutes of stirring, the paste was aspirated into a stainless steel, 2-liter volume, pressure reactor. After the entire mixture had been charged to the reactor, the reactor was purged three times by pressurizing with nitrogen then venting the nitrogen. During the initial pressurization, stirring was initiated using a 2-inch diameter anchor-style stirring element driven by a magnetic coupling to a motor. Stirring was increased until a final rate of 180 rpm, as measured by the shaft's rotation, was achieved.

After the pressure inside the reactor reached 40 pounds per square inch (psi), the pressure was slowly vented to return the system to near atmospheric pressure while maintaining a slow nitrogen bleed through the reactor. After the final nitrogen purge the pressure within the reactor was again increased to 40 psi.

Following this final pressurization step, the reactor's contents were heated to 245° C. over approximately 60 minutes using a resistance heating coil external to the reactor's contents. During the heat-up time, the reactor's pressure and stirring rate were maintained at 40 psi and 180 rpm, respectively.

After the target reaction temperature of 245° C. was achieved the reaction conditions were kept constant for the duration of the reaction sequence. The reaction time was 200 minutes based upon an expected extent of completion of the esterification reactions. The by-product of the reaction is water. The actual extent of reaction was estimated by monitoring the mass of water collected over time. Water was removed from the vessel by distilling the water vapor from the reactor through a one inch diameter, 2.5 foot long, heated vertical column, fitted to the reactor's head. This column was packed with ¼" diameter glass beads to facilitate the separation of the low boiling reaction by-products from free ethylene glycol and the esterification products. The column was connected by a horizontal section of pipe to a water cooled condenser. The lower end of the condenser was fitted with a pressure control valve that was positioned directly above a beaker resting on a balance. This arrangement allowed for the continuous removal of low-boiling reaction by-products from the reactor.

At the end of 200 minutes, the reactor pressure was reduced to atmospheric pressure over a twenty-five minute time period. The oligomer was collected in a stainless steel pan, allowed to cool and then analyzed.

Analyses of the oligomer product using proton nuclear magnetic resonance spectroscopy (NMR) determined the extent of reaction, the molar ratio of ethylene glycol to terephthalate and isophthalate moieties, the diethylene glycol content and the end group concentration.

The oligomer was allowed to harden, pulverized and subsequently polymerized as described below.

Approximately 119 g of granulated oligomer product were placed into a 500 ml round-bottom flask. A stainless steel paddle stirrer with a ¼ inch (0.635 cm) diameter shaft and a 2 inch (5.08 cm) diameter paddle was inserted into the round-bottom flask. An adapter fabricated with fittings for a nitrogen purge line, a vacuum line/condensate takeoff arm, a vacuum tight stirring shaft adapter, and a rubber septum for injection of additives, was inserted into the flask's 24/40 standard taper ground glass joint.

A nitrogen purge was initiated and the assembled apparatus was immersed into a pre-heated, molten metal bath whose temperature had equilibrated at 225° C. Once the flask's contents had melted, stirring was initiated. The conditions used for the entire reaction process are summarized in table below.

TABLE I

| Stage | Duration (minutes) | Temp. (° C.) | Pressure (mm Hg) | Stirring Rate (rpm of shaft) |
|---|---|---|---|---|
| 1 | 0.1 | 225 | Atmospheric | 25 |
| 2 | 5 | 225 | Atmospheric | 25 |
| 3 | 20 | 265 | Atmospheric | 50 |
| 4 | 5 | 265 | Atmospheric | 100 |
| 5 | 5 | 285 | Atmospheric | 100 |
| 6 | 1 | 285 | 200 | 100 |
| 7 | 1 | 285 | 0.8 | 100 |

TABLE I-continued

| Stage | Duration (minutes) | Temp. (° C.) | Pressure (mm Hg) | Stirring Rate (rpm of shaft) |
|---|---|---|---|---|
| 8 | 75 | 285 | 0.8 | 75 |
| 9 | 1 | 285 | 150 | 0 |

Phosphorus was injected into the mixture at stage 6 as a solution of phosphoric acid in ethylene glycol. The target level of phosphorus was 20 ppm based on the theoretical yield of polyester. After completion of the reaction time indicated in Table I above, the metal bath was removed and the stirring stopped. Within fifteen minutes the polymer mass had cooled sufficiently to solidify. The cooled solid was isolated from the flask and ground in a Wiley hammer mill to produce a coarse powder whose average particle diameter was less than 3 mm. The powder was submitted for various tests such as solution viscosity, color, diethylene glycol content and ultraviolet absorber concentration.

The described reaction procedure typically produces a polyester having an intrinsic viscosity as measured at 25° C. in a mixture of 60% by weight phenol, 40% by weight 1,1,2,2-tetrachloroethanol, within the range of 0.60-0.72 dL/g.

The yield of UV absorbing compound present in the polymer was 23%. This was determined by measuring the absorbance of a solution produced by dissolving a known mass (~0.2 g) of the reaction product in 25 ml of a trifluoroacetic acid (TFA)-methylene chloride (5% by weight TFA, 95% methylene chloride) mixture. The absorbance of the solution was compared to that of a standard series produced by spiking mixtures of 5% trifluoroacetic acid –95% methylene chloride with known quantities of the UV absorbing compound. Absorbance measurements for this series of samples produced a relationship between the concentration of UV absorber compound and a solution's absorbance in accordance with Beer's law: A=abc (where A=absorbance, a=molar absorptivity, b=path length and c=concentration). Measurements were made using a 1 cm cell with a Perkin-Elmer Lambda 35 spectrophotometer. Absorbance was measured for all samples at 345 nm. Neat solvent mixture was used to blank the instrument prior to the evaluation of the ultraviolet absorber containing samples. The concentration of the UV absorber compound was determined by extrapolation of the test sample's absorbance to the linear fit of the absorbance vs. concentration data generated for the standard series.

COMPARATIVE EXAMPLE 2

The procedure of Comparative Example 1 was repeated. The yield of UV absorbing compound present in the polymer was 26%.

COMPARATIVE EXAMPLE 3

The procedure of Comparative Example 1 was repeated except the UV absorbing compound was prepared in accordance with U.S. Pat. No. 5,532,332 and had the following formula:

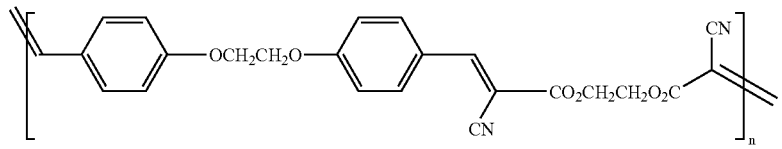

The yield of UV absorbing compound present in the polymer was 26%.

COMPARATIVE EXAMPLE 4

The procedure of Comparative Example 1 was repeated except the UV absorbing compound was prepared in accordance with U.S. Pat. No. 4,707,537 and had the following formula:

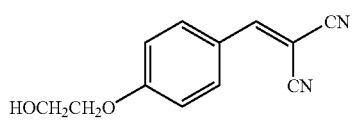

The yield of UV absorbing compound, shown above, that was present in the polymer product was determined to be 4%.

COMPARATIVE EXAMPLE 5

The procedure of Comparative Example 1 was repeated except the UV absorbing compound was prepared in accordance with U.S. Pat. No. 5,532,332 and had the following formula:

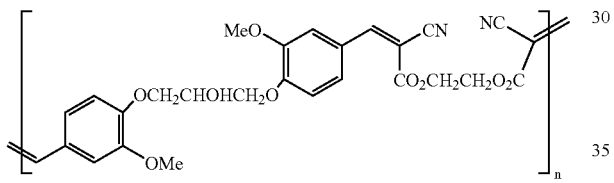

The yield of UV absorbing compound, shown above, that was present in the polymer product was determined to be 11%.

EXAMPLE 1

Polyester oligomer was prepared in accordance with Comparative Example 1, except that no ultraviolet absorber was added to the mixture charged to the pressure reactor. Instead, 2.0 grams of a mixture containing 2.00 g of UV absorber compound of Comparative Example 1 in 100 g of ethylene glycol was added to the flask at the initiation of polymerization. This addition level theoretically will provide a concentration of 400 parts of absorbing compound to 1,000,000 parts of polymer.

The yield of UV absorber compound present in the polymer product was 77%.

EXAMPLES 2-7

The procedure of Example 1 was repeated. However, the precise amount of material charged depended on the results of the NMR analyses of the starting material. Generally, enough UV absorber compound was added to theoretically provide a concentration of UV absorber compound in the product of 400 parts of absorbing compound to 1,000,000 parts of polymer.

The results of the Examples 2-7 appear in Table II below.

TABLE II

| Example | Addition Point of UV Absorber | Yield of UVI (concentration found/ concentration charged) |
|---|---|---|
| 2 | Post esterification -pre vacuum | 80% |
| 3 | Post esterification -pre vacuum | 75% |
| 4 | Post esterification -pre vacuum | 75% |
| 5 | Post esterification -pre vacuum | 85% |
| 6 | Post esterification -pre vacuum | 77% |
| 7 | Post esterification -post vacuum | 86% |

EXAMPLE 8

The procedure of Example 1 was repeated except the UV absorbing compound was that described in Comparative Example 3 above. The yield of UV absorbing compound, shown above, that was present in the polymer product was determined to be 44%.

EXAMPLE 9

The procedure of Example 1 was repeated except the UV absorbing compound was that described in Comparative Example 4 above. The yield of UV absorbing compound, shown above, that was present in the polymer product was determined to be 25%.

EXAMPLE 10

The procedure of Example 1 was repeated except the UV absorbing compound was that described in Comparative Example 5 above. The yield of UV absorbing compound, shown above, that was present in the polymer product was determined to be 42%.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:

1. A method for incorporating a UV light absorbing compound into a polyester prepared using direct esterification of reactants comprising a dicarboxylic acid and a diol, said method comprising:
   a. combining said reactants in an esterifying reactor under conditions sufficient to form an esterified product comprising at least one of: an ester, an oligomer, a low molecular weight polyester and mixtures thereof;
   b. polymerizing the esterified product in a polycondensation reactor to form a polyester; and
   c. adding at least one UV absorbing compound to at least one of said esterification reactor or polycondensation reactor when at least 50% of the carboxy groups initially present in the reactants have been esterified, wherein said UV absorbing compound includes at least one 4-oxybenzylidene radical of Formula I:

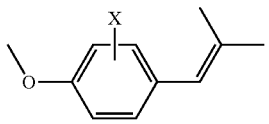

wherein X is hydrogen or up to two moieties selected from the group consisting of hydroxy, $C_1$-$C_6$ alkyl, $C_1$-$C_6$ alkoxy and halogen, and wherein the UV absorbing compound includes a polyester reactive group.

2. The method of claim 1 wherein said dicarboxylic acid is selected from the group consisting of aliphatic, alicyclic, or aromatic dicarboxylic acids.

3. The method of claim 2 wherein said dicarboxylic acid is selected from the group consisting of terephthalic acid; naphthalene dicarboxylic acid; isophthalic acid; 1,4-cyclohexanedicarboxylic acid; 1,3-cyclohexanedicarboxylic acid; succinic acid; glutaric acid; adipic acid; sebacic acid; and 1,12-dodecanedioic acid.

4. The method of claim 1 wherein said diol is selected from the group consisting of ethylene glycol; 1,4-cyclohexanedimethanol; 1,2-propanediol; 1,3-propanediol; 1,4-butanediol; 2,2-dimethyl-1,3-propanediol; 1,6-hexanediol; 1,2-cyclohexanediol; 1,4-cyclohexanediol; 1,2-cyclohexanedimethanol; 1,3-cyclohexanedimethanol; 2,2,4,4-tetramethyl-1,3-cyclobutane diol; X,8bis(hydroxymethyl)tricyclo-[5.2.1.0]-decane wherein X represents 3, 4, or 5; diethylene glycol, triethylene glycol, dipropylene glycol, tripropylene glycol; diols containing from about 2 to about 18 carbon atoms in each aliphatic moiety and mixtures thereof.

5. The method of claim 1 wherein said polyester comprises greater than 50 mole % terephthalic acid residues and greater than 50 mole % ethylene glycol residues, wherein the acid component has 100 mole % and the diol component has 100 mole %.

6. The method of claim 1 wherein said polyester comprises greater than 75 mole % terephthalic acid residues and greater than 75 mole % ethylene glycol residues, wherein the acid component has 100 mole % and the diol component has 100 mole %.

7. The method of claim 1 wherein said UV absorbing compound is added to at least one of said reactors when at least about 70% of the carboxy groups initially present in the reactants have been esterified.

8. The method of claim 1 wherein said UV absorbing compound is added to at least one of said reactors when at least about 80% of the carboxy groups initially present in the reactants have been esterified.

9. The method of claim 1 wherein said UV absorbing compound is added to at least one of said reactors when at least about 85% of the carboxy groups initially present in the reactants have been esterified.

10. The method of claim 1 wherein said UV absorbing compound is added to at least one of said reactors when greater than about 90% of the carboxy groups initially present in the reactants have been esterified.

11. The method of anyone of claims 1, and 7-10 wherein from 0-100% of said UV absorbing compound is added to the esterification reactor.

12. The method of claim 11 wherein from 0 to about 80% of said UV absorbing compound is added to the esterification reactor.

13. The method of claim 11 wherein from 0 to about 50% of said UV absorbing compound is added to the esterification reactor.

14. The method of claim 1 wherein from 0-100% of said UV absorbing compound is added to the polycondensation reactor.

15. The method of claim 1 wherein greater than 50% of said UV absorbing compound is added to the polycondensation reactor.

16. The method of claim 1 wherein greater than 80% of said UV absorbing compound is added to the polycondensation reactor.

17. The method of claim 1 wherein greater than 95% of said UV absorbing compound is added to the polycondensation reactor.

18. The method of claim 1 wherein said UV absorbing compound comprises at least one compound selected from the group consisting of compounds represented by Formulae II-VII:

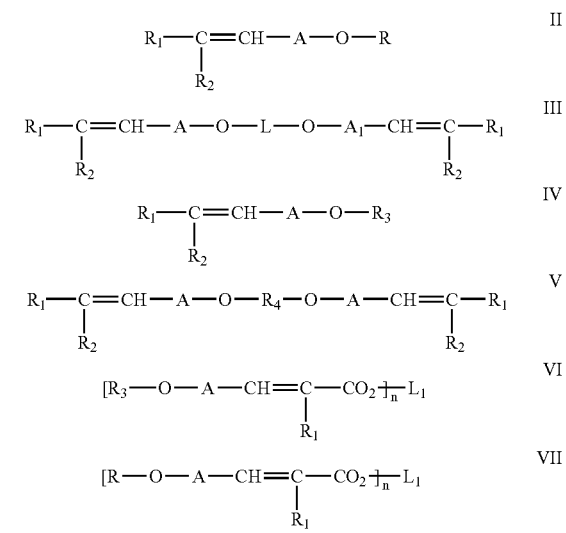

wherein:
R is selected from the group consisting of hydrogen, $C_1$-$C_{12}$-alkyl, substituted $C_1$-$C_{12}$-alkyl, aryl, $C_3$-$C_8$-cycloalkyl, $C_3$-$C_8$-alkenyl and —(CHR'CHR"O—)$_p$ $CH_2$—$CH_2$—$R_5$, wherein p is an integer from 1 to 100;
R' and R" are independently selected from the group consisting of hydrogen and $C_1$-$C_{12}$ alkyl;
n is a whole number ranging from 2 to 4;
$R_1$ is selected from the group consisting of —$CO_2R_6$ and cyano;
$R_2$ is selected from the group consisting of cyano, —$CO_2R_6$, $C_1$-$C_6$-alkylsulfonyl, arylsulfonyl, carbamoyl, $C_1$-$C_6$-alkanoyl, aroyl, aryl, and heteroaryl;
$R_3$ is selected form the group consisting of —$COR_7$, —$CON(R_7)R_8$ and —$SO_2R_7$;
$R_4$ is selected from the group consisting of:

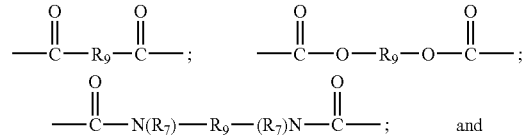

—O₂S—R₉—SO₂—;

R₅ is selected from the group consisting of hydrogen, hydroxy, $C_1$-$C_6$-alkoxy, $C_1$-$C_6$-alkanoyloxy and aryloxy;

R₆ is selected from the group consisting of hydrogen, $C_1$-$C_{12}$-alkyl, substituted $C_1$-$C_{12}$-alkyl, —(CHR'CHR"O—)$_p$CH₂CH₂R₅, $C_3$-$C_8$-alkenyl, $C_3$-$C_8$-cycloalkyl, aryl, and cyano, wherein p is an integer from 1 to 100;

R₇ is selected from the group consisting of $C_1$-$C_8$-alkyl, $C_3$-$C_7$-cycloalkyl and aryl;

R₈ is selected from the group consisting of hydrogen, $C_1$-$C_8$-alkyl, $C_3$-$C_8$-cycloalkyl and aryl;

R₉ is selected from the group consisting of $C_1$-$C_{12}$-alkylene, arylene and $C_3$-$C_8$-cycloalkylene, and —(CHR'CHR"O'—)$_p$CHR'CHR"—, wherein p is an integer from 1 to 100;

L is a divalent organic linking groups bonded by non-oxo carbon atoms;

L₁ is a di, tri, or tetravalent linking group, wherein the divalent radical is selected from the group consisting of $C_2$-$C_{12}$- alkylene, —(CHR'CHR"O—)$_p$CHR'CHR"—, $C_1$-$C_2$-alkylene-1,4-phenylnene-$C_1$-$C_2$-alkylene, —CH₂CH₂O-1,4-phenylene-OCH₂CH₂, and —CH₂-1,4-cyclohexylene-CH₂—, wherein p is an integer from 1 to 100 and wherein the trivalent and tetravalent radicals are selected from the group consisting of $C_3$-$C_8$ aliphatic hydrocarbon having three or four covalent bonds;

A and A₁ are independently selected from the group consisting of 1,4-phenylene and 1,4-phenylene substituted with one or two groups selected from the group consisting of hydroxy, halogen, $C_1$-$C_6$-alkyl and $C_1$-$C_6$-alkoxy.

19. The method of claim 18 wherein said alkoxylated moiety represented by the formula —(CHR'CHR"O—)p is selected from the group consisting of ethylene oxide residues, propylene oxide residues, or residues of both, and p is less than about 50.

20. The method of claim 19 wherein p is from 1-3.

21. The method of claim 18 wherein said UV absorbing compound is selected from the group consisting of compounds represented by Formulae VIII-X:

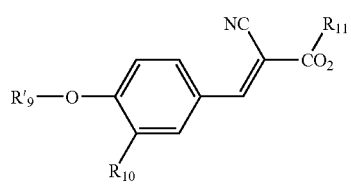

VIII

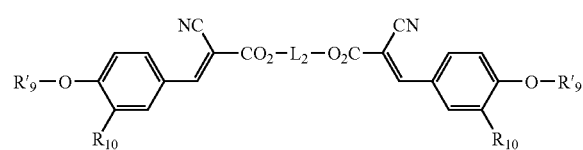

IX

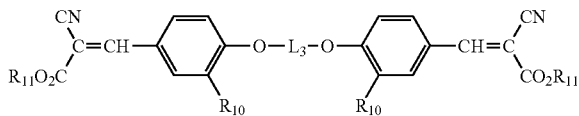

X wherein:

R'₉ is selected from the group consisting of hydrogen, $C_1$-$C_6$-alkyl and —(CHR'CHR"O—)$_p$CH₂CH₂OR₁₂, wherein p is an integer from 1 to 100;

R₁₀ is selected from the group consisting of hydrogen and $C_1$-$C_6$-alkoxy;

R₁₁ is selected from the group consisting of $C_1$-$C_6$-alkyl; cyclohexyl, phenyl, and —(CHR'CHR"O—)$_p$R₁₂, and wherein p is an integer from 1 to 100;

R₁₂ is selected from the group consisting of hydrogen and $C_1$-$C_6$ alkyl;

L₂ is selected from the group consisting of $C_2$-$C_6$-alkylene, —(CH₂CH₂O)$_p$—CH₂CH₂, and —CH₂-cyclohexane-1,4-diyl-CH₂—, wherein p is an integer from 1 to 100; and L₃ is selected from the group consisting of $C_2$-$C_6$-alkylene, —(CH₂CH₂O)$_p$—CH₂CH₂ and $C_3$-$C_8$-alkenylene, wherein p is an integer from 1 to 100.

22. The method of claim 18 wherein said UV absorbing compound is selected from the compounds represented by Formulae XI and XII:

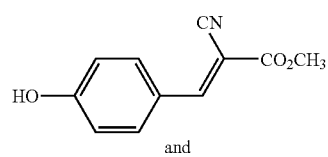

XI and

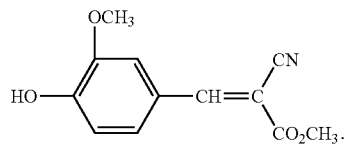

XII

23. The method of claim 1 wherein the amount of UV absorbing compound incorporated into said polyester has a yield greater than 25%.

24. The method of claim 23 wherein the yield is greater than 40%.

25. The method of claim 23 wherein the yield is greater than 50%.

26. The method of claim 23 wherein the yield is greater than 75%.

* * * * *